United States Patent

[11] 3,592,440

[72] Inventors Rolland McFarland
Crystal Lake;
Werner K. Priese; Barrington, both of, Ill.
[21] Appl. No. 868,289
[22] Filed Oct. 16, 1969
[45] Patented July 13, 1971
[73] Assignee Hills-McCanna Company
Carpentersville, Ill.
Continuation-in-part of application Ser. No. 573,121, Aug. 17, 1966, now abandoned.

[54] BALL VALVE
9 Claims, 12 Drawing Figs.
[52] U.S. Cl. .................................... 251/170,
29/157.1, 251/174, 251/176, 251/315, 251/368, 29/420
[51] Int. Cl. ....................................... F16k 25/00, F16k 5/20
[50] Field of Search ............................ 251/315; 137/246

[56] References Cited
UNITED STATES PATENTS
| | | | |
|---|---|---|---|
| 3,107,080 | 10/1963 | Priese | 251/171 UX |
| 3,108,779 | 10/1963 | Anderson | 251/315 X |
| 3,132,836 | 5/1964 | Dickerson | 251/171 |
| 3,167,300 | 1/1965 | Kaiser | 251/315 |
| 3,173,648 | 3/1965 | McGuire | 251/315 X |
| 3,185,489 | 5/1965 | Lohr | 251/315 X |
| 3,267,558 | 8/1966 | Wilson | 251/315 X |
| 3,298,753 | 1/1967 | Eaton | 308/36 UX |
| 3,393,695 | 7/1968 | Wall | 137/246 |
| 2,967,539 | 1/1961 | Bradbury | 137/246 |
| 3,231,235 | 1/1966 | Anderson | 251/315 X |

FOREIGN PATENTS
| | | | |
|---|---|---|---|
| 962,561 | 5/1957 | Germany | 251/368 |

Primary Examiner—Clarence R. Gordon
Attorney—Olson, Trexler, Wolters & Bushnell

ABSTRACT: A ball valve of the type wherein the flow control ball member is supported by valve seats and is free to "float" in the sense that it can move axially under fluid pressure and transversely of its axis under either mechanical or fluid pressure. This latter transverse movement is employed in conjunction with and relative to the support means for the seats to maintain the seats in firm sealing contact with the ball surface. To facilitate the maintaining of sealing contact, and to permit unrestricted free movement of the seats, the respective contiguous surfaces on said seats and said support means are defined by a low-friction plasticlike material. Further, there is provided a novel seat construction which, in addition to attaining the aforementioned mode of operation, provides increased load support for the ball, and will function when the valve is exposed to excessive heat.

Inventors
Rolland McFarland, Jr.
Werner K. Friese
By: Olson, Trexler, Wolters & Bushnell attys

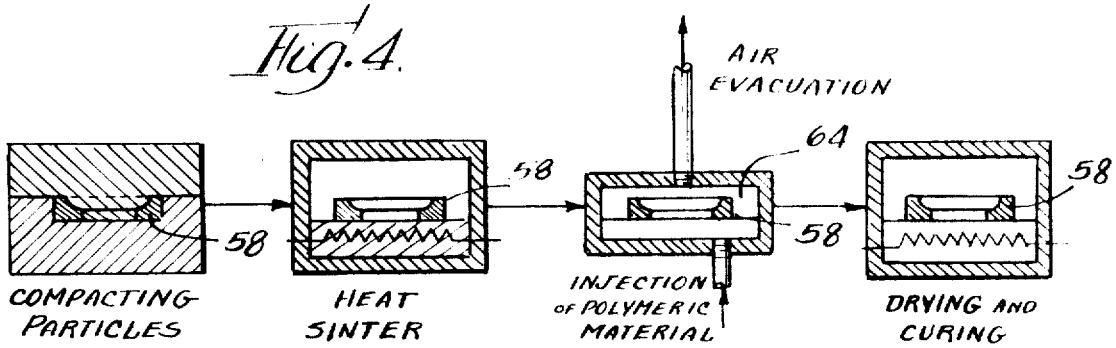
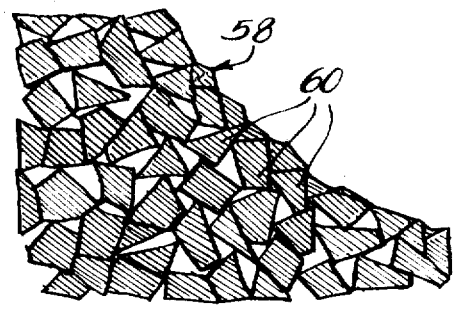
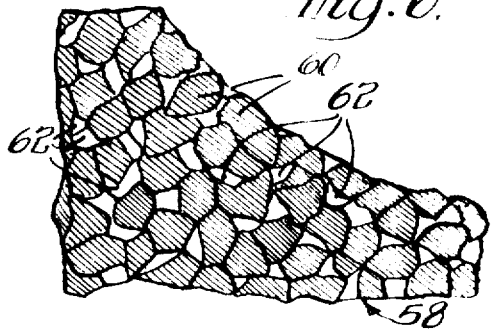
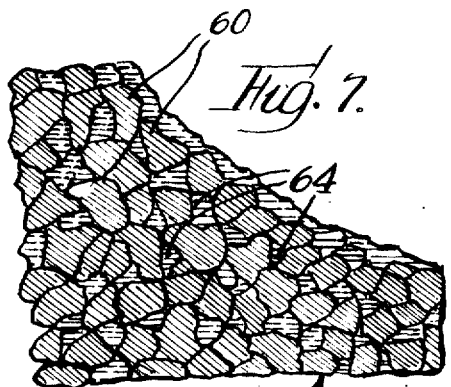
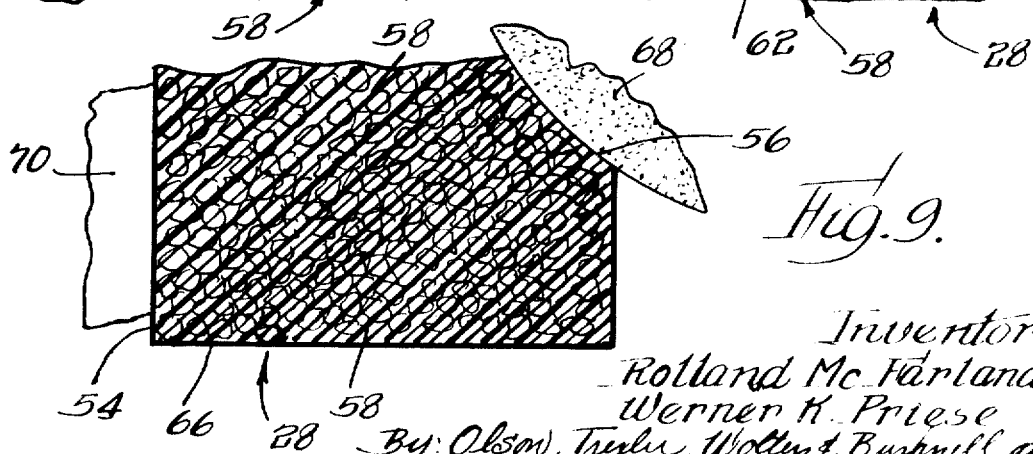

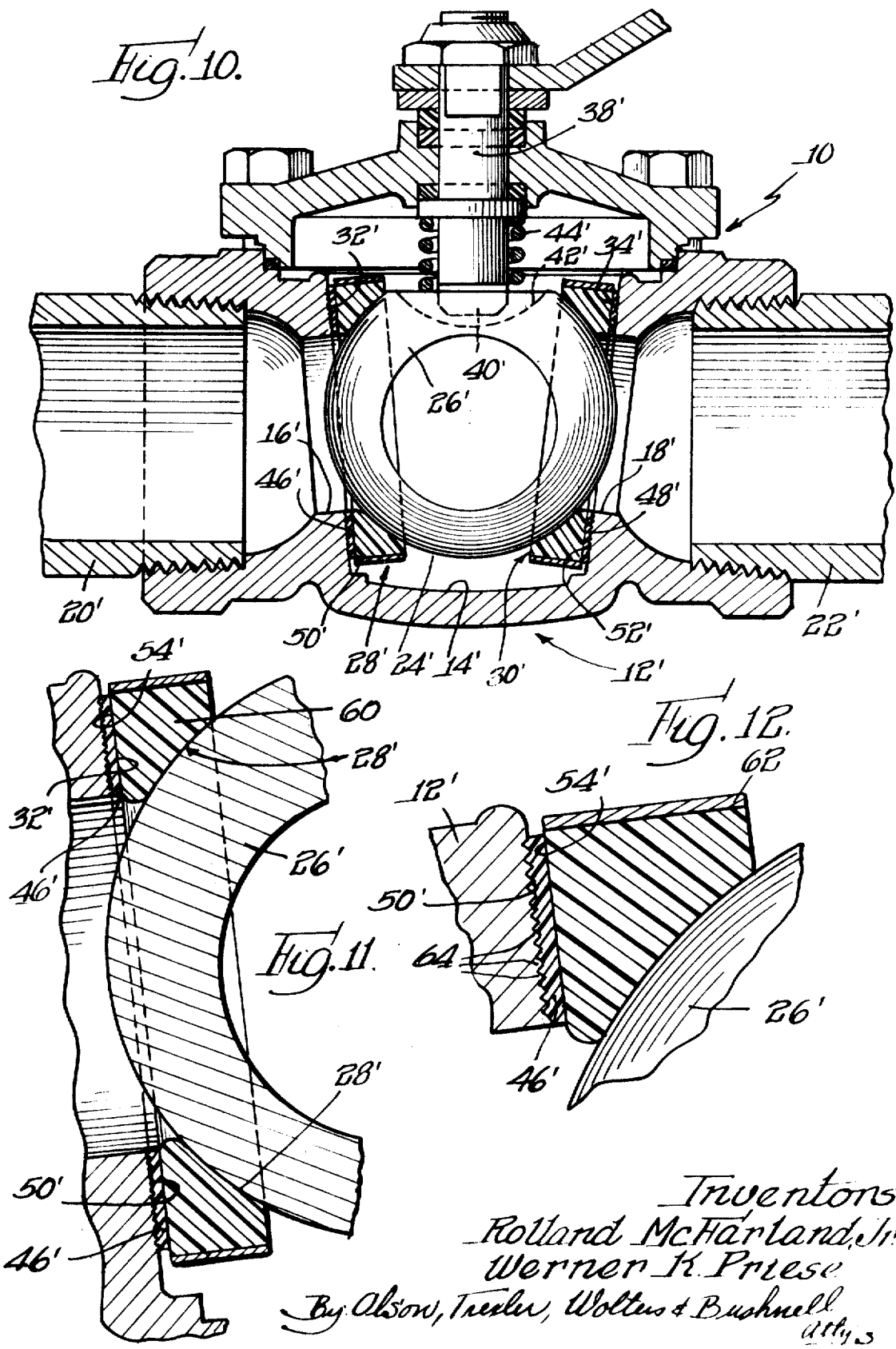

BALL VALVE

REFERENCE TO RELATED APPLICATION

The present application is directed to subject matter disclosed and claimed in U.S. application Ser. No. 573,121, filed Aug. 17, 1966, now abandoned. Accordingly, this is a continuation-in-part thereof.

BACKGROUND OF THE INVENTION

The present invention relates to ball valves and is especially advantageous in ball valves in which the valve ball "floats" in the sense that it is subject to displacement by the force of differential fluid pressure on the ball. The invention is directed more specifically to ball valves of the type in which the valve is tightened by moving the valve ball and coacting seat structure in a transverse direction in relation to the flow passages opening into the valve chamber containing the valve ball.

In a ball valve of the character to which this invention relates, the valve seat is required to form a seal between the valve ball and the body structure encircling a flow passage to the valve without imposing undue resistance to rotation of the ball and without causing wear on the ball. If the seat is disposed on the downstream side of a valve ball which is free to move against the downstream seat, the full force of differential fluid pressure on the ball as applied by the ball to the downstream seat can have a destructive effect on the valve.

In prior valves, seat structures capable of forming good seals between a valve ball and the body structure encircling a fluid passage have been subject to abuse by temperatures and pressures exceeding the limitations that are normal for such valves. Many such valves are subject to complete failure upon exposure to excessive heat, as in the event of a fire, even though the valve temperatures reached are not sufficient to destroy metal components of the valves. Valves less vulnerable to damage have generally been less effective in precluding the leakage of fluid through the valves.

One form of ball valve to which the present invention relates is illustrated in U.S. Pat. No. 3,168,279. In this particular type of valve, the planes containing the annular seat-supporting surfaces are such that they converge, contrary to the prior art embodiments which generally utilize parallel supporting surfaces. Further, biasing means is employed to engage the ball and force it as well as the seats inwardly in a direction corresponding to that of the convergence of said seat support surfaces. Thus, this valve construction is self adjusting, the converging nature of the support surfaces tending to force the seats into firm sealing contact with the ball.

However, free movement of the seats relative to the support surfaces is essential to attainment of this self-adjusting characteristic; a factor that presents some problems. More specifically, should the support surface be rough initially, or become rough during use, free-sliding movement is impeded. Teflon, or other similar materials normally used to construct or coat the surface on the seat which engage the support surface will cold flow. Accordingly, when under pressure for any length of time, the seat material flows or moves into the discontinuities in the support surface. This factor not only hampers freedom of movement of the seats, per se, but materially shortens their service life.

While precision finishing of the seat support surface provides an initial answer to this problem, it is by no means satisfactory. In the first instance, precision machining is expensive, and materially increases the cost of the valve, but more importantly, it is not a permanent solution to the problem. That is, when in use the support surfaces are subject to corrosion, and soon even the most precision finished surface becomes roughened, due to the tubercles of corrosion.

Accordingly, one of the primary objects of this invention is to provide a ball valve having the self-adjusting features mentioned above, but being free from the aforediscussed problems which seriously affect the necessary free-sliding movement of the seats and shorten the life of the valve.

A further object is the provision of a ball valve of the general type discussed, wherein a thin shim of slippery plastic material is used to define the seat support surfaces such that free-sliding movement of the seat is realized.

Still another object of the present invention is the provision of a ball valve, as mentioned in the preceding paragraph, wherein the factors creating the problem of restricted movement in the prior art structures are utilized to effect firm anchoring or positioning of said Teflon shim.

One object of the invention is to provide an improved ball valve having a novel construction which affords worthwhile advantages in effectively sealing the valve in its closed condition against the leakage of fluid through the valve while, at the same time, enabling the valve to withstand, without undue stress or harmful effect, the powerful force of differential fluid pressure on the valve ball which is free to move against the downstream seat under the force of fluid pressure.

Another object is to provide an improved ball valve which affords the dual advantages of a superb capability to effectively seal the valve against the leakage of fluid through the valve and the capability of the valve seat to withstand, without distortion or damage, very high forces applied by the coacting valve ball.

More specifically stated, a further object of the invention is to provide an improved ball valve which affords the strength advantages of metallic seats and the sealing effectiveness advantages of seats formed of yieldable polymeric material.

Another object is to provide a ball valve in which very strong seats having the inherent ability to withstand high applied forces without distortion or damage have the capability of compensating for irregularities and imperfections in coacting parts to assure effective sealing against leakage of fluid through the valve while, at the same time, imposing a very low frictional resistance to opening and closing of the valve.

Another object is to provide a ball valve having an improved construction affording the advantages recited in the preceding objects and providing for progressive tightening of the valve ball and seats by lateral translation of the ball and seats with respect to flow passages opening into the valve while, at the same time, effectively protecting from wear yieldable polymeric structure of the valve seats which functions to provide an effective seal between the valve seats and valve body.

A further object is to provide an improved ball valve of the character recited which still remains effective to block the flow of fluid through the valve even in the event of a fire subjecting the valve to temperatures which destroy the structure of yieldable polymeric material which normally provides an effective seal against leakage of fluid through the valve.

Another object is to provide a novel and advantageous method for producing a novel and advantageous valve seat for incorporation into a ball valve of the character recited in the preceding objects.

Other objects and advantages will become apparent from the following description of the invention taken in conjunction with the drawings in which:

FIG. 4 is a schematic illustration of a plurality of steps of the method provided for making one of the seats used in the valve of FIG. 1;

FIG. 5 is a fragmentary sectional view on an enlarged scale of the metal body structure of an individual seat as initially compacted and shaped from powdered or pulverous metal, the size of the individual metal particles being greatly enlarged for clearness in illustration;

FIG. 6 is a fragmentary sectional view, similar to FIG. 5, but showing the metal particles partially fused together by partial sintering of the body as previously shaped from compacted metal particles;

FIG. 7 is a fragmentary sectional view generally similar to FIG. 6 but showing the pores and surface of the partially sintered metal body filled and covered with uncured polymeric material;

Figure 1:
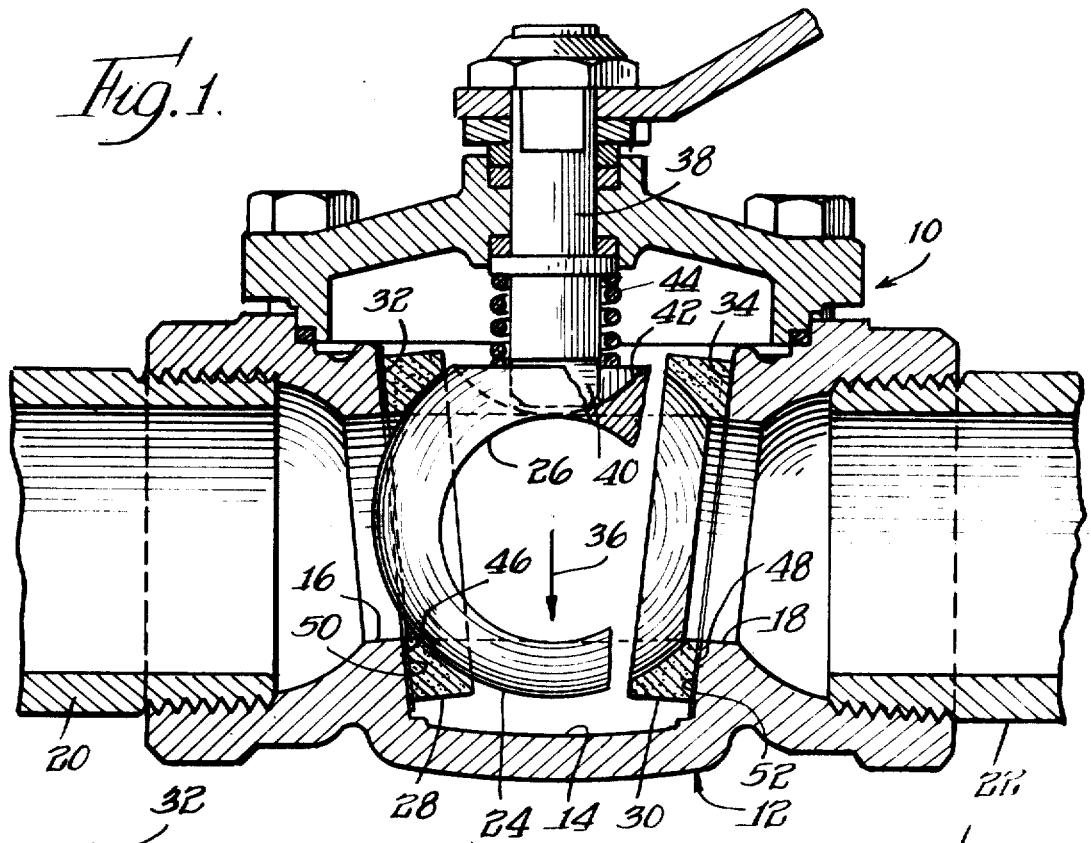
FIG. 1 is a longitudinal sectional view of a ball valve forming the exemplary embodiment of the invention illustrated.

FIG. 8 is a fragmentary sectional view similar to FIG. 7 but illustrating the part after curing of the polymeric material infused into and covering the partially sintered metal body structure of the seat; and FIG. 9 is a fragmentary radial sectional view of a typical seat of the valve as finished by grinding and lapping tools, shown in fragmentary section in working engagement with the base and ball sealing surfaces being finished on the valve seat;

FIG. 10 is a sectional view similar to FIG. 1, and illustrating a modified form of the invention;

FIG. 11 is an enlarged, fragmentary sectional view illustrating one of the valve seats of FIG. 10;

FIG. 12 is a fragmentary sectional view of the upper portion of the valve seat of FIG. 11, on still a larger scale, and showing how the Teflon shim cold flows into the discontinuities of the underlying body surface.

Referring to the drawings in greater detail, the valve 10, shown in FIG. 1 and illustrating one embodiment of the invention, comprises valve body means 12 defining an internal valve chamber 14 and two flow passages 16, 18 opening into opposite sides of the chamber 14 and adapted to be connected, for example, to coacting conduits 20, 22. A flow control ball 24 defining a flow bore 26 therein is rotatably disposed within the valve chamber 14 between the flow passages 16, 18.

Opposite sides of the ball 24 are slidably engaged by two annular valve seats 28, 30 encircling the inner ends of the respective passages 16, 18 and slidably supported by two flat annular seat support surfaces 32, 34 formed on the body means 12 in encircling relation to the inner ends of the respective passages 16, 18.

The two seat support surfaces 32, 34 are oriented to have a converging relation to each other in a transverse direction relative to the passages 16, 18, which transverse direction is represented in FIG. 1, by the arrow 36.

The flow control ball 24 is rotated between an open valve position in which opposite ends of the bore 26 are aligned with the two passages 16, 18, as indicated by dotted lines in FIG. 1, and the closed valve position shown in solid lines in FIG. 1 in which the ball bore 26 is turned out of alignment with both passages 16, 18. Rotation of the ball 24 between these two positions is effected by control means which permits the ball to move in the transverse direction 36 in which the seat support surfaces 32, 34 converge. In the construction illustrated, the ball is rotated by a control stem 38 having a driving tang 40 extending into a coacting slot 42 in the ball. The slot 42 and tang 40 are dimensioned and oriented in relation to the ball 24 to allow the ball to "float" in the sense that it is free to move in the downstream direction against the downstream valve seat under the force of differential fluid pressure on the ball.

The valve seats 28, 30 are simultaneously tightened against the ball 24 and against the seat support surfaces 32, 34 to maintain an optimum sealing pressure between the seats and ball and between the seats and seat support surfaces, by displacing the ball 24 and seats 28, 30 in the transverse direction 36 in which the seat support surfaces 32, 34 converge. In the construction illustrated, the ball and seats are continuously urged yieldably in the direction 36 of convergence of the seat support surfaces by a helical compression spring 44 encircling the stem 38 and acting against the ball 24 in the direction 36.

Dynamic adjustment of the valve to modify the degree of tightness of the seats 28, 30 against the ball 24 and against the seat support surfaces 32, 34 necessarily entails a degree of sliding movement of the seats 28, 30 over the seat support surfaces 32, 34 in the transverse direction 36 of convergence of the seat support surfaces. Conversely, if this sliding motion of the seats 28, 30 on the support surfaces 32, 34 is impeded, the desired adjustment of the degree of tightness of the valve is prevented. Hence, roughness of the seat support surfaces 32, 34 can have a deleterious effect on both the proper functioning and service life of the valve. Roughness of the support surfaces 32, 34 can impede the sliding action of the seats 28, 30 on the support surfaces 32, 35 which is essential optimum functioning of the valve and it can be a source of undue wear and abrasion of coating structure of the valve seats with the result that the service life of the seats is shortened.

Precise machining and finishing of such seat support surfaces to assure a high order of smoothness of the surfaces in the past has been a significant factor in the manufacturing cost of valves of this character.

In the improved valve 10, the seat support surfaces 32, 34 are formed by washer-shaped annular discs or laminae 46, 48 formed of a low friction, slippery plasticlike material such, for example, as polytetrafluoroethylene disposed in encircling relation to the inner ends of the respective passages 16, 18 to form component elements of the body means 12. Each of the individual laminae 46, 48 is formed preferably as a flat annular ring portion of a sheet of plastics material having a thickness of the order of 0.003 to 0.005 of an inch. For purposes of illustration, this dimension is exaggerated in the drawings. As illustrated in the enlarged fragmentary sectional view of FIG. 2, the slippery plastics lamina 46 is supported on a flat annular base surface 50 formed on the main structure of the body means 12 in encircling relation to the passage 16.

A similar surface 52 rough machined on the main structure of the body means 12 and encircling the passage 18 supports the lamina 48 of slippery plastics material. Rough machining of the surfaces 50, 52 can be effected at low cost, the roughness of the surfaces 50, 52 having no harmful effect and, in fact, being an advantage in holding in place the slippery plastics laminae 46, 48 which define highly advantageous seat support surfaces 32, 34 which form excellent seals with the supported valve seats 28, 30 while, at the same time, providing for easy sliding movement of the valve seats 28, 30 over the support surfaces 32, 34. The overall result is the achievement of both significant minimization of manufacturing cost and assurance of easy displacement of the ball 24 and seats 28, 30 to provide the desired degree of valve tightness.

Each of the valve seats 28, 30 of the embodiments of FIGS. 1—9 is constructed in a manner which provides the strength and permanency of shape characteristic of metal construction and lubricity and sealing effectiveness characteristic of yieldable polymeric materials such, for example, as polytetrafluoroethylene. As the two seats 28, 30 are formed as mirror images of each other, a detailed description of the construction and method of making one will suffice for both.

Figure 2:
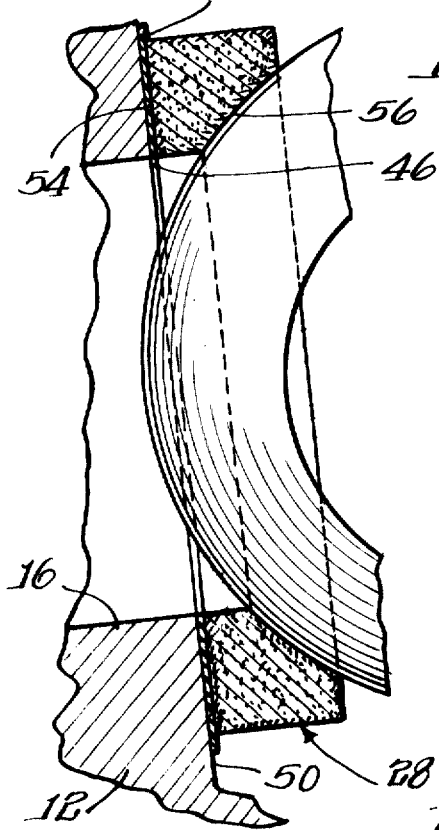
FIG. 2 is a fragmentary sectional view on an enlarged scale showing, in diametrical section, one valve seat, coacting seat support structure of the valve body and the adjacent portion of the valve ball.

As shown in FIG. 2, the seat 28, annular in form, is shaped and formed to define a radially extending, flat annular base surface 54, FIG. 9, which confronts and fits slidably against the supporting surface 32. On its radial side generally opposite from the surface 54, the seat 28 defines an annular ball sealing surface 56 shaped as an annular segment of a spherical surface conforming in curvature to the ball 24.

Structurally, the valve seat 28 comprises a porous annular body 58 made of metal and infused and covered, at least on the sides thereof confronting the support surface 32 and the ball 24, by a yieldable polymeric material, preferably having a high order of lubricity. Such a material is polytetrafluoroethylene.

The method provided by the invention for forming the valve seat 28 is illustrated in FIGS. 4 through 9. Having reference to FIG. 4, the first step in the construction of the seat 28 comprises compacting or molding pulverous or powdered metal into a shaped annular form conforming generally to the shape of the seat 28 to be produced. Stainless steel or bronze in pulverous or powdered form have been found to be suitable as structural materials for the valve body 58. At this stage, the body is "green" and the compacted metal particles 60 forming the green body 58 remain together largely as consequence of being compacted by pressure into the desired shape of the body 58. The size of the compacted particles 60, as illustrated in the fragmentary sectional view, FIG. 5, of the freshly compacted body is much enlarged for convenience in illustration.

The green body 58 shaped as by molding of the compacted metal particles 60 is then heated, as schematically illustrated in FIG. 4, to effect a partial sintering or fusion of the adjacent metal particles to each other, as illustrated in the enlarged fragmentary sectional view of FIG. 6, in which the size of individual particles is exaggerated for convenience in illustration. More particularly, the molded body 58 is heated to produce a partial sintering which effects fusion of adjacent particles to each other to a degree sufficient to unite all the particles by fusion to produce a one-piece metallic body. The heating and consequent sintering of the molded body is limited so that the body remains porous with multitudinous interstices or pores 62 disposed between the many partially fused particles of the body, FIG. 6.

The partially fused body 58 is next placed in a vacuum chamber 64, illustrated schematically in FIG. 4, wherein the gas within the pores or interstices 62 in the body is evacuated.

Next, an uncured plastics material is supplied to fill in the evacuated pores 62 and cover the external surface of the metal body 58. Polytetrafluoroethylene is a most suitable material for infusing and covering the porous metal body 58. As supplied in its uncured state, polytetrafluoroethylene is frequently in a pulverous state. Infusion of the pores 62 and covering the surface of the partially sintered metal body 58 with such pulverous plastics material can be effected by entraining the plastic material with a suitable dispersant in a liquid ve' :le to form a suspensoid or mixture which is applied, preferably under pressure, to the gas evacuated metal body. A fragmentary sectional view of the metal body 58, as infused and covered by a mixture 64 of liquid and pulverous plastics material, appears in FIG. 7.

The liquid vehicle is subsequently evaporated and the plastics material is cured by heating to leave the metal body 58 infused and covered by the cured yieldable polymeric or plastics material 66, as illustrated in the fragmentary sectional view of the partially completed valve seat appearing in FIG. 8.

As previously indicated, polytetrafluoroethylene, sold commercially under the trademark Teflon, is a most suitable yieldable polymeric material for infusing and covering the porous metal body. It will be understood, however, that the invention is not limited necessarily to use of polytetrafluoroethylene as the yieldable polymeric or plastics material for infusing and covering the porous metal body. Other yieldable polymeric materials which can be used for this purpose include polymonochlorotrifluoroethylene, sold commercially under the trademark Kel-F, vinylidenefluoride, sold commercially under the trademark Kynar, and polyimide. The liquid vehicle in which the plastics material is entrained or suspended to form the fluent suspensoid mentioned should be relatively easy to vaporize and of such chemical character that it does not have a deleterious effect on the suspended plastics material. Plain water is suitable as such a liquid vehicle. Other liquids of suitable physical properties can be selected by those skilled in the art for use as the liquid vehicle. In some instances, xylene or anhydrous alcohol may, for example, be used, provided the liquid selected does not have an undesirable chemical or physical reaction with the suspended or entrained plastics material.

After curing of the plastics material 66 which infuses and covers the metal body 58, the concave annular ball sealing surface 56 is preferably finished with accuracy, as by grinding, engagement of a finishing wheel or lapping tool 68 with the surface 56 being illustrated in FIG. 9. Also, the base surface 54 of the valve seat 28, formed by the metal body 58 and covered by the plastics material 66, is preferably lapped to a smooth flat form as by means of a lapping tool 70, FIG. 9.

The yieldably polymeric or plastics material 66 such, for example, as polytetrafluoroethylene, used to infuse and cover the metal seat body 58, preferably has a slippery physical character affording a high order of lubricity which makes for easy sliding of the seat over the adjacent support surface 50 and the opposing surface of the ball 24.

As indicated, the valve seat 30 is constructed in the same manner as the seat 28.

By virtue of the strength of the metal bodies of the seats 28, 30, thus formed, the seat on the downstream side of the ball 24 is capable of withstanding, without harmful distortion or damage, a strong force of differential fluid pressure applied to the "floating" ball 24 when the valve is closed and transmitted by the ball to the seat. At the same time, the ball sealing surface 56 and the base surface 54 of the seat 28, for example, as defined by the slippery yieldable polymeric or plastics material 66, serves to advantage in forming most effective and advantageous seals with the ball 24 and seat support surface 32.

The porosity of the body 58 of the seat 28, for example, is of advantage not only in providing internal interstices into which the covering plastics material 66 becomes rooted and anchored in place, but also produced in the metal body a degree of yieldability which enables the seat, as a whole, to conform itself to both the ball 24 and adjacent supporting structure on the body 12, while at the same time enabling the body 58 to have a size in radial section which approaches the corresponding overall size of the valve seat. This achieves, at once, both the advantages of having a controlled degree of flexibility in the seat as a whole, and the advantages of severely limiting the thickness of the plastics material 66 covering the body and defining the seat surfaces 54, 56. The fact that the porous metal body 58 extends into relatively close proximity to both the surfaces 54, 56 defined by the plastics material 66 is of advantage in providing close support of sturdy metal to the surfaces 54, 56 so that distortion and displacement by applied loads of the plastics material defining the surfaces 54, 56 is advantageously minimized.

It will be appreciated that metal reinforcing bands previously provided in encircling relation to annular valve seats of the prior art can be provided, if desired, to encircle each of the seats 28, 30.

Even in the event of a fire exposing the valve 10 to temperatures sufficient to break down the structure of the polymeric or plastics material 66 which infuses and covers the body 58 of each of the valve seats 28, 30, the valve seat on the downstream side of the ball 24 will nevertheless function, when the ball is turned to its closed valve position, to effectively block the flow of liquid through the valve. This capacity of the valve 10 to provide an effective stoppage of flow even in the event of destruction of the plastics material by the heat of a fire stems from the body 58 of the seat 28, for example, having a shape conforming to the overall shape of the seat and having a size which is only a limited degree smaller than the overall size of the seat. Even though the body 58 is porous, and even though the physical structure of the polymeric material 66 is broken down by heat, the polymeric material 66 leaves a residue which functions well to stop up or caulk the pores 62 in the body 58 and the interstices around the body sufficiently to block leakage past the metal seat body 58, when the valve is exposed to extreme heat.

The embodiment of FIGS. 10—12 differs primarily from that discussed hereinbefore, only in the specific type of seat construction employed. Accordingly, elements or features of this embodiment identical or substantially similar to those previously described will be designated by like reference characters, primed.

Further, since the general overall construction and operation of this embodiment of FIGS. 10—12 are the same as considered in detail with regard to FIGS. 1—9, a repetition thereof is deemed unnecessary, the preceding discussion being incorporated herein by reference. Accordingly, the following description of said embodiment is directed to the alternate seat construction employed.

Basically, the seats 28' and 30' of this embodiment are of identical construction. Accordingly, only the structure of seat 28' will be detailed, it being understood that seat 30' is of like construction.

As best viewed in FIGS. 11 and 12, seat 28' is comprised of a main, annular body portion 60 of Teflon or the like, which defines the ball engaging surface 56' and the support surface engaging surface 54'. Teflon is but one example of numerous materials possessing the necessary rigidity required in a seat of this nature, and also having sufficient yieldability to achieve the desired sealing effect. However, as mentioned above, these materials are subject to cold flow, thus, said seat 28' also includes an annular restraining ring or band 62, preferably of metal. The metal restraining band 62 maintains the dimension of the Teflon ring 60, in the radial direction, against any tendency of the material to cold flow. Thus, the metal band 62 forms a component element of seat 28'.

To review briefly, the mode of operation of this type of ball valve, the spring 44' engages ball 24' and forces it downwardly, as illustrated. Due to the concave, spherical configuration of the surface 56' of seats 28' and 30', they tend to move with ball 24'. This downward movement results in the surface 54' of the seats sliding relative to corresponding seat supporting surfaces 32' and 34'. Further, since the supporting surfaces 32' and 34' converge in this direction of movement, said seats 28' and 30' are urged into tight sealing engagement with the outer spherical surface of the ball 24'.

Figure 3:
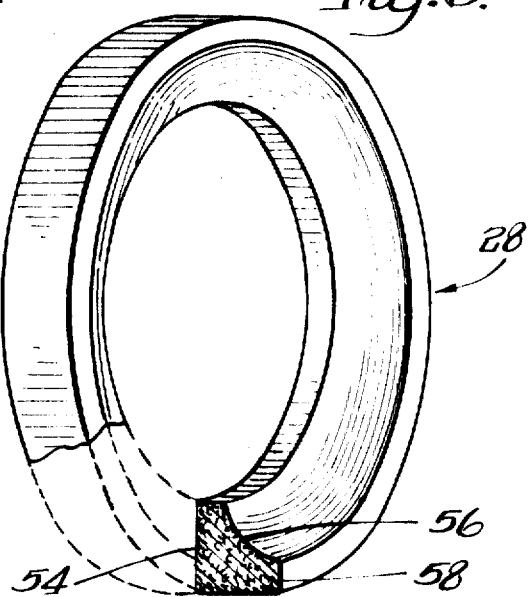
FIG. 3 is a partially sectioned perspective view of one seat of the valve of FIG. 1.

The seat support surface 32', shown in FIGS. 2 and 3, is defined by a thin, washerlike shim or lamina 48' of Teflon or similar, slippery, plasticlike material, Thus, due to the resulting Teflon surface 54' provided by the solid annular seat body 60, relative movement between seat 32' and the valve body takes place along a Teflon-to-Teflon interface. This feature assures smooth, unhampered movement of the seat 32', and efficient sealing action.

Similar to the manner in which seat 32' is forced into engagement with ball 24' by the converging seat supporting surfaces 32', 34', the shim 46' is also urged into engagement with the underlying surface 50' of body 12. This action tends to maintain the shim 46' in proper position. However, to facilitate this, the underlying surface, 50' is rough machined, as best shown in FIG. 12.

When placed under a load, the shim 46' tends to cold flow into the discontinuities of surface 50', which are designated by reference character 64 in FIG. 12. Accordingly, the shim 46' is firmly gripped and will not move out of position relative to body 14'.

It should be noted that this invention is not limited to the specific type of seat construction illustrated. Also, the manner in which the seats are urged against the ball also may vary from that illustrated. Thus, it is contemplated that those skilled in this art may effect numerous changes, modifications or alterations, without departing from the spirit and scope of the invention.

We claim the invention as follows:

1. A ball valve comprising, in combination; a valve body defining an internal valve chamber, two flow passages opening into opposite sides of said chamber and a flat seat support surface encircling the inner end of each said respective passage, which surfaces converge in a direction transverse to the axis of said bore, said seat support surface being defined by a thin lamina of low-friction, plasticlike material supported by the underlying structure of the valve body; a flow control ball member defining a flow bore therethrough and being rotatably disposed within said chamber between said passages; two annular valve seats supported by said respective seat support surfaces in encircling relation to the inner ends of said respective passages, each said seat including a ball-engaging surface disposed in sealing contact with the outer surface of said flow control ball, and a base surface engaged against said support surface, said base surface being defined by a low-friction, plasticlike material; and means tending to bias said ball and said seats in the direction of convergence, such that said seats may slide freely relative to the seat support surface in conjunction with movement of said ball, with said seat support surfaces forcing said seats into firm sealing contact with the ball.

2. A ball valve according to claim 1, wherein each said lamina is defined by an annular member and the underlying structure of the valve body supporting said member is rough to engage frictionally said member and to maintain same in position during movement of the seat relative thereto.

3. A ball valve according to claim 1 wherein each said annular valve seat comprises, an annular body of low-friction plasticlike material, said body having the base surface and the ball-engaging surface formed thereon.

4. A ball valve as defined in claim 3 wherein said annular valve seat further includes an annular restraining band disposed about the radially outer surface of said seat to maintain the dimensions thereof.

5. A ball valve according to claim 1 wherein each said valve seat comprises; a porous annular body formed of metal particles partially fused together, and a low-friction, plasticlike material covering the ball-engaging and seat-support-engaging surfaces of said seat, with said low friction plasticlike material filling the pores of said seat to a substantial depth.

6. A ball valve comprising, in combination; valve body means defining an internal valve chamber and two flow passages opening into opposite sides of said chamber, a flow control ball defining a flow bore therein and being rotatably disposed within said chamber between said passages, said body means having thereon two flat seat support surfaces encircling the inner ends of said respective passages and converging in a direction transverse to said passages, each said seat support surface being defined by a thin lamina of low-friction, plasticlike material, two annular valve seats supported on said seat support surfaces in encircling relation to the inner ends of said respective passages, each said seat including an annular ball-engaging surface in sealing contact with said ball and a base surface disposed in engagement with said support surface of the body means, said base surface being defined by low-friction, plasticlike material such that said seats slide freely relative to their respective support surfaces, and means tending to bias said ball and said seats together in said direction of convergence of said seat support surfaces to effect tightening of said seats against said ball, each said lamina being defined by an annular member and the underlying structure of the valve body supporting said lamina being rough to engage frictionally said lamina and maintain same in place during movement of the corresponding seat relative thereto.

7. A ball valve according to claim 6 wherein each said annular valve seat comprises, an annular body of low-friction plasticlike material, said body having the base surface and the ball-engaging surface formed thereon.

8. A ball valve as defined in claim 7 wherein said annular valve seat further includes an annular restraining band disposed about the radially outer surface of said seat to maintain the dimensions thereof.

9. A ball valve according to claim 6 wherein each said valve seat comprises; a porous annular body formed of metal particles partially fused together, and a low-friction, plasticlike material covering the ball-engaging and seat-support-engaging surfaces of said seat, with said low-friction plasticlike material filling the pores of said seat to a substantial depth.